March 17, 1936.  J. W. WALSH  2,034,644
HOSE COUPLING
Filed Feb. 13, 1934    2 Sheets-Sheet 1

WITNESS:
*Rob't R. Mitchel*

INVENTOR
Joseph W. Walsh
BY
Augustus B. Stoughton
ATTORNEY.

March 17, 1936.  J. W. WALSH  2,034,644
HOSE COUPLING
Filed Feb. 13, 1934  2 Sheets-Sheet 2

INVENTOR
Joseph W. Walsh
BY
Augustus B Stoughton
ATTORNEY.

WITNESS:

Patented Mar. 17, 1936

2,034,644

UNITED STATES PATENT OFFICE 2,034,644

HOSE COUPLING

Joseph W. Walsh, Lansdowne, Pa., assignor to Dixon Valve & Coupling Co., a corporation of Pennsylvania Application February 13, 1934, Serial No. 710,982

1 Claim. (Cl. 285—86)

The principal object of the present invention is to provide a joint between a hose and a coupling which shall be mechanically strong and tight, even under considerable pressure from the inside or from the outside of the hose according as the hose is used as pressure or suction hose. Another object of the invention is to provide a coupling devoid of loose or projecting parts and possessed of the characteristics mentioned and which shall be comparatively simple and inexpensive in construction and yet very efficient in use.

Other objects of the invention will appear from the following description at the end of which the invention will be claimed.

Generally stated, the invention consists in a hose coupling element comprising a tubular body having spaced, springy jaws attached or anchored directly to one end of the body and arranged in a circular row and each jaw having a stem forming a part of said jaw, a head on the end of said stem, and at least one arm on said head. The outer surfaces of said heads and of said arms bear a single continuous screw-thread.

The invention comprises the improvements to be presently described and finally claimed.

In the following description reference will be made to the accompanying drawings forming part hereof and in which.

Figures 1, 2:
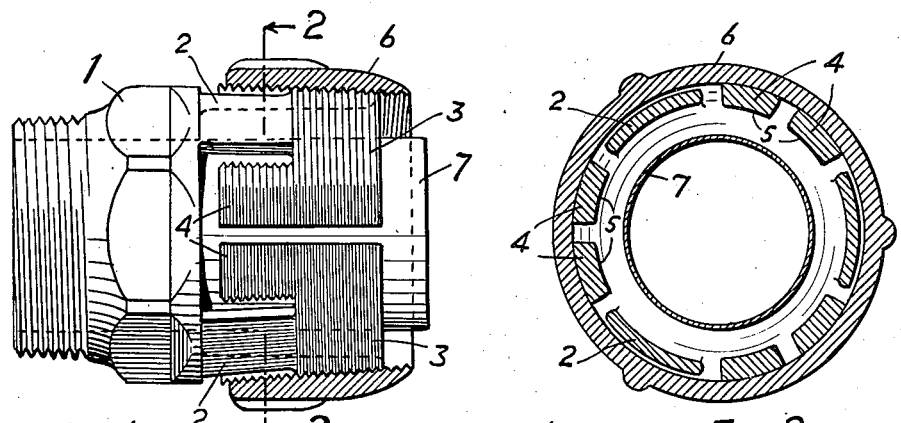
Figure 1 is a sectional view partly in elevation of a hose coupling embodying features of the invention.
Figure 2 is a transverse section taken on the line 2—2 of Figure 1.

Referring to the drawings, 1 is a tubular body provided at one end with spaced generally T-shaped jaws of which the stem portions 2 are springy and extend from the end of the body 1 and of which the head portions 3 and arm portions 4 are arranged in a circular row and are externally tapered and threaded and lie outside of the stem portions 2. The inner surfaces 5 of these jaws are cylindrical and may be ribbed and they are of larger internal diameter than the internal diameter of the body and may extend inward toward the center beyond the stem portions 2. 6 is an internally tapered and threaded nut. 7 is a sleeve that extends outward from the body 1 and terminates generally beyond the end of the jaws. The heads 3 are thicker than the stems 2, so that the jaws are springy, and the stems 2 are attached or anchored directly to the end of the tubular body 1, so that there are no loose parts.

In use, the hose $a$ is applied over the sleeve 7 and the tapered nut 6 is screwed onto the tapered thread of the jaws with the result that the stems or shanks 2 are sprung inward and segments of the cylindrical surface, provided by the heads 3 and arms 4, are drawn together and pressed inward onto the surface of the hose $a$ exerting upon it a powerful and permanent grip. The sleeve 7 opposes collapse of the wall of the hose. The operation may be referred to by saying that the segments of the cylindrical surface are drawn together thus reducing or tending to reduce the diameter of the cylinder so that the clamping action can be likened to that of a split or segmental ring of which the parts are drawn together which, as is well known, makes an extremely strong and tight joint. It may be stated that the construction is exceedingly compact and that while its operation may be likened to that of a contracting ring it is devoid of objectionable projecting parts.

It will be understood that two coupling elements are usually employed, and the thread on the body 1 is an example of means for connecting them.

Figure 4:
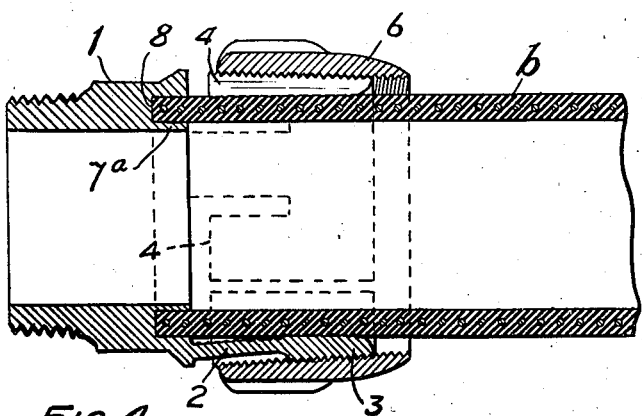
Figure 4 is a similar view illustrating a modification which is adapted for use with a hose reenforced with wire.

The construction and mode of operation of the modification shown in Figure 4 are as above described except that the sleeve 7 is omitted and the end of the body 1 is provided with an annular groove or recess 8 into which the reinforced hose $b$ is inserted and supported by a lip 7$a$. In this case the reinforcement of the hose sufficiently opposes collapse of its wall and the action of the coupling when tightened up tends to crowd the end of the hose into the recess 8, thus providing tightness in the joint.

Since the stem portions 2 are springy they permit of the described operation of the jaws, and since they are integral with both the body and the head portions 3, they are strong to resist breakage of the coupling element.

Figure 3:
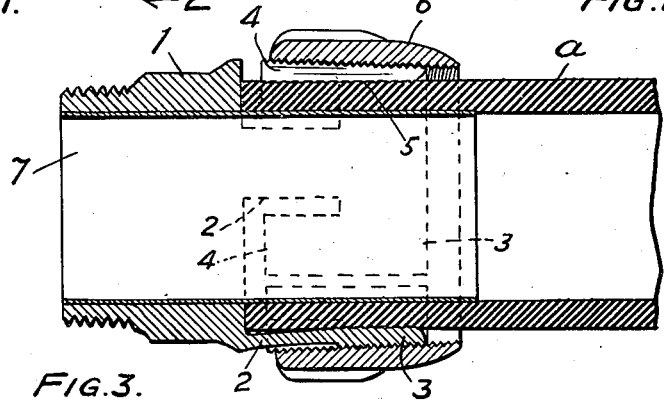
Figure 3 is a longitudinal sectional view illustrating a hose in application to a coupling of Figure 1.
Figure 5:
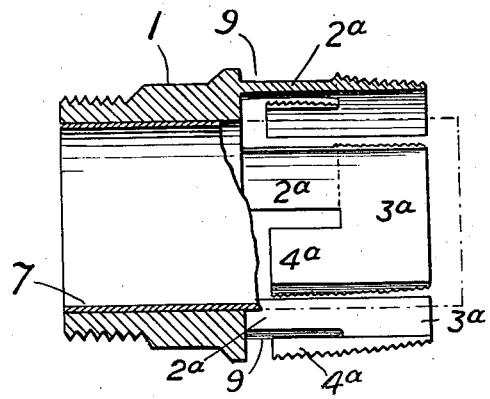
Figure 5 is a sectional view illustrating a hose coupling element embodying another modification of the invention.

The construction and mode of operation of the modification shown in Figure 5 are as above described, except that the heads 3$a$ and arms 4$a$ of the jaws are of half T-shape, and the stems 2$a$ are made springy by reducing their thickness in respect to the heads 3$a$ from the outside as indicated at 9. In this figure the coupling element happens to be shown as adapted for use with hose such as indicated at *a* in Figure 3.

It will be obvious to those skilled in the art to which the invention relates that modifications may be made in details of construction and arrangement and in matters of mere form without departing from the spirit of the invention which is not limited in respect to such matters or otherwise than as the prior art and the appended claim may require.

I claim:

A hose coupling element comprising: a tubular body adapted to receive the end of a hose; spaced jaws provided at one end of said body and arranged in a circle; springy, elongated stems forming part of said jaws and extending from the end of said body; a head on the end of each of said stems; arms carried by each of said heads and projecting towards said end of the body and spaced from said stems; the outer surfaces of said heads and of said arms being tapered and being covered by a single, continuous screw-thread and lying outside of the plane of the outer surfaces of the stems; and the inner surfaces of said heads and of said arms being in the form of segments of a cylinder.

JOSEPH W. WALSH.